United States Patent
Ohshima et al.

(10) Patent No.: US 12,163,034 B2
(45) Date of Patent: Dec. 10, 2024

(54) SILVER INK FOR LOW-TEMPERATURE CALCINATION

(71) Applicant: TANAKA KIKINZOKU KOGYO K.K., Tokyo (JP)

(72) Inventors: Yuusuke Ohshima, Tsukuba (JP); Yuichi Makita, Tsukuba (JP); Hiroki Sato, Tsukuba (JP); Noriaki Nakamura, Tsukuba (JP); Kenjiro Koshiji, Tsukuba (JP); Masato Kasuga, Tsukuba (JP); Hitoshi Kubo, Tsukuba (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 240 days.

(21) Appl. No.: 17/272,070

(22) PCT Filed: Aug. 15, 2019

(86) PCT No.: PCT/JP2019/032068
§ 371 (c)(1),
(2) Date: Feb. 26, 2021

(87) PCT Pub. No.: WO2020/045111
PCT Pub. Date: Mar. 5, 2020

(65) Prior Publication Data
US 2021/0324218 A1    Oct. 21, 2021

(30) Foreign Application Priority Data
Aug. 30, 2018  (JP) ................................. 2018-162008

(51) Int. Cl.
*C09D 11/037*    (2014.01)
*B22F 1/00*    (2022.01)
(Continued)

(52) U.S. Cl.
CPC .............. *C09D 11/037* (2013.01); *B22F 1/00* (2013.01); *C09D 11/02* (2013.01); *C09D 11/03* (2013.01);
(Continued)

(58) Field of Classification Search
None
See application file for complete search history.

(56) References Cited

U.S. PATENT DOCUMENTS

| 2008/0124238 A1 | 5/2008 | Atsuki et al. | |
| 2011/0094411 A1* | 4/2011 | Oyanagi ................ | C09D 11/36 106/31.9 |

(Continued)

FOREIGN PATENT DOCUMENTS

| JP | 2006-169613 A | 6/2006 |
| JP | 2014-040630 A | 3/2014 |

(Continued)

OTHER PUBLICATIONS

International Searching Authority, "International Search Report," issued in connection with International Patent Application No. PCT/JP2019/032068, dated Nov. 5, 2019.

(Continued)

*Primary Examiner* — Katie L. Hammer
(74) *Attorney, Agent, or Firm* — Foley & Lardner LLP

(57) ABSTRACT

A silver ink including silver particles and a protective agent containing at least one amine compound dispersed in a dispersion medium containing, as a main solvent, a solvent having a vapor pressure at 20° C. of 40 mmHg or less and a vapor pressure at 70° C. of 0.09 mmHg or more, in an amount of 80% or more on a mass basis relative to the total dispersion medium. The amine compound has a mass average molecular weight of 115 or less, and the total amount of the amine compound is 1 part by weight or more and 14 parts (Continued)

by weight or less per 100 parts by weight of the silver particles. The silver ink has a moisture content of 500 ppm or more and 50,000 ppm or less and enables a practical metal film to be formed even through calcination at a low temperature of 70° C. or less.

20 Claims, 1 Drawing Sheet

(51) Int. Cl.
  *B22F 9/00* (2006.01)
  *B22F 9/30* (2006.01)
  *C09D 11/02* (2014.01)
  *C09D 11/03* (2014.01)
  *C09D 11/033* (2014.01)
  *C09D 11/52* (2014.01)
  *H01B 1/00* (2006.01)
  *H01B 1/22* (2006.01)
  *B82Y 30/00* (2011.01)
  *B82Y 40/00* (2011.01)

(52) U.S. Cl.
  CPC ............ *C09D 11/033* (2013.01); *C09D 11/52* (2013.01); *H01B 1/00* (2013.01); *H01B 1/22* (2013.01); *B22F 9/00* (2013.01); *B22F 9/30* (2013.01); *B82Y 30/00* (2013.01); *B82Y 40/00* (2013.01)

(56) References Cited

U.S. PATENT DOCUMENTS

| | | | |
|---|---|---|---|
| 2014/0312284 A1* | 10/2014 | Liu | ........................... B22F 1/07 |
| | | | 252/514 |
| 2015/0231698 A1 | 8/2015 | Kurihara et al. | |
| 2015/0245480 A1 | 8/2015 | Kubo et al. | |
| 2016/0121404 A1 | 5/2016 | Makita et al. | |
| 2016/0303659 A1 | 10/2016 | Makita et al. | |
| 2017/0215279 A1 | 7/2017 | Kubo et al. | |
| 2017/0256332 A1 | 9/2017 | Miyazaki et al. | |
| 2018/0193913 A1 | 7/2018 | Iwai et al. | |

FOREIGN PATENT DOCUMENTS

| | | |
|---|---|---|
| JP | 5732520 B1 | 6/2015 |
| JP | 5795096 B2 | 10/2015 |
| JP | 2016-048601 A | 4/2016 |
| JP | 6068406 B2 | 1/2017 |
| JP | 6189740 B2 | 8/2017 |
| JP | 6270831 B2 | 1/2018 |
| WO | WO-2013/115300 A1 | 8/2013 |
| WO | WO-2014/024630 A1 | 2/2014 |
| WO | WO-2015/129562 A1 | 9/2015 |
| WO | WO-2016/052292 A1 | 4/2016 |
| WO | WO-2017/033911 A1 | 3/2017 |

OTHER PUBLICATIONS

International Searching Authority, "Written Opinion," issued in connection with International Patent Application No. PCT/JP2019/032068, dated Nov. 5, 2019.

* cited by examiner

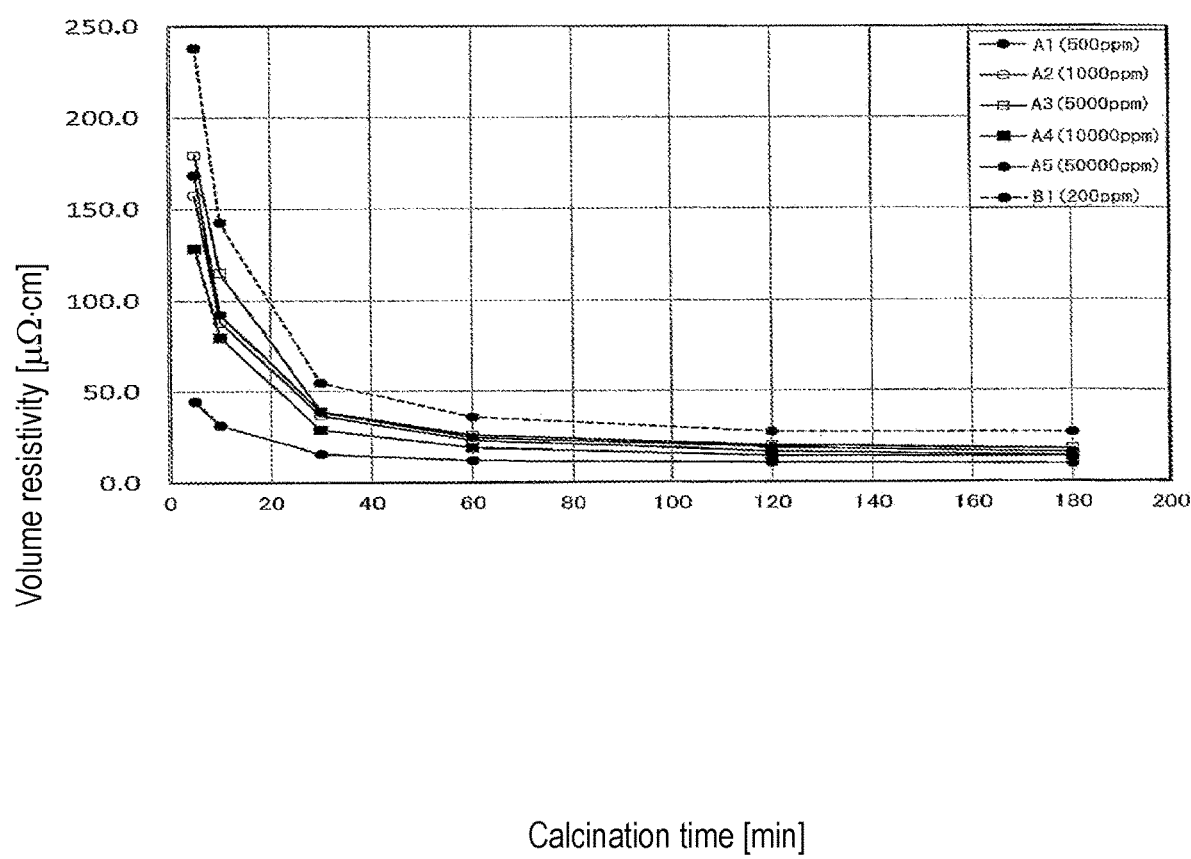

SILVER INK FOR LOW-TEMPERATURE CALCINATION

RELATED APPLICATIONS

The present application claims priority under 37 U.S.C. § 371 to International Patent Application No. PCT/JP2019/032068, filed Aug. 15, 2019, which claims priority to and the benefit of Japanese Patent Application No. 2018-162008, filed on Aug. 30, 2018. The contents of these applications are hereby incorporated by reference in their entireties.

TECHNICAL FIELD

The present invention relates to a silver ink having a protective agent and silver particles dispersed in a dispersion medium. It particularly relates to a silver ink that can be calcined at a low temperature of 70° C. or less and is capable of forming a low-resistance metal film.

BACKGROUND ART

For the formation of electrodes, lines, or electrically-conductive films on circuit boards of various electronic devices or on transparent wiring boards of touch panels, displays, and the like, use of a metal ink has been attracting attention. A metal ink has fine particles of an electrically-conductive metal dispersed in a dispersion medium, and is a functional material that, when applied to a suitable substrate, forms a metal film with a desired shape or pattern to serve as an electrode or the like. The metal film formation process by use of a metal ink is advantageous in that, as compared with the conventional thin film formation process such as sputtering, a vacuum atmosphere is not required, and the device cost can also be reduced.

An example of a metal ink is the metal ink containing silver particles (silver ink) described in Patent Document 1. Silver particles applied to this silver ink can be obtained by allowing a silver compound to react with an amine to form a silver-amine complex and thermally decomposing the same. Silver particles produced by this method are in the state of being protected (covered) with an amine and have a fine and uniform particle size. According to such a metal ink containing a protective agent and silver particles, the silver particles can be sintered at a relatively low temperature to form a metal film.

A metal ink having low-temperature sinterability can expand substrate options, making it possible to suitably form electrodes and lines on resin substrates, such as plastics and PET, and organic material substrates, such as polyimide, in addition to metal or glass substrates. The present applicant has conducted a large number of studies on silver inks having low-temperature sinterability. For example, Patent Documents 2 to 4 disclose silver inks having excellent low-temperature sinterability, in which the particle diameter of silver particles, the configuration of an amine compound serving as a protective agent, and the like are adjusted.

In addition, in metal inks such as silver inks, it is believed that various characteristics including low-temperature sinterability are affected largely by the configuration of silver particles. The present applicant has also studied the process for producing silver particles favorable for a metal ink, and disclosed methods for producing silver particles with various particle diameter ranges (e.g., Patent Document 5 to Patent Document 7).

RELATED ART DOCUMENT

Patent Documents

Patent Document 1: JP 2014-40630 A
Patent Document 2: Japanese Patent No. 5,795,096
Patent Document 3: Japanese Patent No. 6,068,406
Patent Document 4: WO 2017/033911
Patent Document 5: Japanese Patent No. 5,732,520
Patent Document 6: Japanese Patent No. 6,189,740
Patent Document 7: Japanese Patent No. 6,270,831

SUMMARY OF THE INVENTION

Problems to be Solved by the Invention

In the formation of a metal film by use of a silver ink as described above, a silver ink is applied completely or partially to an object, such as a substrate, and then heated. As a result, the dispersion medium and the protective agent are evaporated, and the sintering of silver particles proceeds, whereby a metal film is calcined. In the case of a conventional silver ink that advocates low-temperature sinterability, as the heating temperature for forming a metal film within a practical range, the temperature is often set between 100° C. and 200° C. (Patent Documents 2 to 4).

In recent years, in various devices such as displays, organic electronics have been increasingly applied. Many of organic electronic materials have even lower resistance to high temperatures than semiconductors and electronic materials that have been used in the past. In order to apply metal inks such as silver inks to organic electronics, further low-temperature sinterability is required.

Specifically, a metal ink that can be calcined at about 70° C. and is capable of forming a low-resistance metal film that can function as an electrical conductor is necessary. However, none of heretofore known silver inks, including the conventional art described above, can meet such needs. An example of a problem with the silver inks of conventional art is that in such a silver ink, although sintering itself takes place at a temperature of less than 100° C., the formation of a metal film requires a heating time of several tens of hours to several days. In addition, in the conventional silver inks, even if sintering is completed, the resulting electrical resistance value (volume resistance value) may be high.

The present invention has been accomplished against the above backdrop, and provides a silver ink containing silver particles, which is capable of forming a practical metal film even through calcination at a low temperature of 70° C. or less.

Means for Solving the Problems

As described above, the calcination of a silver ink means binding caused by the evaporation and desorption of a protective agent and also by the approaching of silver particles, whose base metal surfaces are exposed at the same time, to each other and their sintering. Thus, the conventional idea is that the lowering of the silver ink calcination temperature significantly depends on the configuration of silver particles and the protective agent bonded thereto. The present inventors have also conducted studies to solve the above problems from such a point of view, that is, by the configuration of an amine compound-based protective agent. As a result, they have found that at least one amine compound should be used as a protective agent, and that its molecular weight should be limited.

However, the present inventors have also confirmed that the required low-temperature sintering cannot be completely achieved merely by strictly specifying the protective agent. Thus, they have decided to do further studies, and, as the direction, decided to study the entire configuration of a silver ink. As a result, they have found that certain restrictions are necessary also on silver particles and a dispersion medium for dispersing the protective agent. Then, in addition to this, they have also found that the moisture content in the silver ink affects low-temperature sinterability. The present inventors have studied the suitable range for each of the above elements, that is, protective agent, dispersion medium, and moisture content, and thus arrived at the present invention.

That is, the present invention is a silver ink including silver particles and a protective agent containing at least one amine compound dispersed in a dispersion medium. The silver ink is characterized in that the dispersion medium contains a main solvent having a vapor pressure at 20° C. of 40 mmHg or less and a vapor pressure at 70° C. of 0.09 mmHg or more in an amount of 80% or more on a mass basis relative to the total dispersion medium, the amine compound contained in the protective agent has a mass average molecular weight of 115 or less, the total amount of the amine compound contained in the protective agent is 1 part by weight or more and 14 parts by weight or less per 100 parts by weight of the silver particles, and the silver ink has a moisture content is 500 ppm or more and 50,000 ppm or less on a mass basis relative to the total silver ink.

As described above, the present inventive silver ink is composed of silver particles and a protective agent dispersed in a dispersion medium, and further has a controlled moisture content relative to the total silver ink. Hereinafter, each configuration will be described in detail.

Incidentally, as can be seen from the above Patent Documents 1 to 3, the silver ink, which is the subject matter of the present invention, is sometimes referred to as "silver paste" depending on the content of silver particles or additives. In the present invention, a silver ink means a dispersion liquid (silver dispersion liquid) having silver particles and a protective agent dispersed in a dispersion medium. The technical scope of the silver ink of the present invention is not restricted by its designation, such as "silver paste" or "silver slurry".

(I) Silver Particles

As silver particles dispersed in the present inventive silver ink, those same as in the conventional silver ink or silver paste described above are applied. The silver particles preferably have an average particle diameter of 5 nm or more and 300 nm or less. The average particle diameter of the silver particles is more preferably 7 nm to 150 nm, and still more preferably 10 nm or more and 100 nm or less.

Incidentally, the particle size of silver particles means the particle size of individual particles dispersed in the silver ink, and is the particle size of silver particles excluding the protective agent part. Specifically, the size of only metal particles observed under an electron microscope, such as SEM or TEM, is referred to as "particle size." At this time, even when particles are in contact with each other, in the case where the grain boundary is clearly observed, such particles are judged as individual particles, respectively. Incidentally, in the measurement of the average particle size of metal particles, it is preferable that based on a TEM or like electron microscope image, 1,000 or more (preferably about 3,000) arbitrary particles are selected, the major axis and the minor axis of an individual particle are measured to calculate the particle size by a two-axis method, and the average of the selected particles is calculated.

The silver particle content in the silver ink can be set within a range of 20 mass % or more and 85 mass % or less on a metal mass basis relative to the total mass of the silver ink. When the silver particle content is less than 20%, a metal film having a uniform film thickness for ensuring sufficient electrical conductivity cannot be formed, and the resistance value of the metal film increases. When the silver particle content is more than 85%, the aggregation of silver particles is likely to occur, and the workability in application/printing may be deteriorated. The silver particle content is more preferably 30 mass % or more and 75 mass % or less. Incidentally, "100 parts by weight of the silver particles" in the present invention means that the content of silver particles specified on a metal mass basis as described above is 100 parts by weight.

(II) Dispersion Medium

In a silver ink, a dispersion medium is an important configuration that maintains the dispersion state of silver particles and also has the action of spreading the silver particles at the time of silver ink application. In the present invention, certain restrictions are required on the dispersion medium. Specifically, it is required that a solvent having a vapor pressure at 20° C. of 40 mmHg or less and a vapor pressure at 70° C. of 0.09 mmHg or more is used as a main solvent.

The reason why the solvent having the vapor pressure characteristics described above is used as a main solvent is that the handleability of the silver ink is secured, and also the balance of low-temperature sinterability and the characteristics of a metal film is optimized. That is, the application/printing of a silver ink is usually performed at ambient temperature. The purpose of the vapor pressure at 20° C. of 40 mmHg or less is to maintain the ink state at this time. Meanwhile, at the time of sintering, a solvent that has a high vapor pressure at the sintering temperature and volatilizes quickly is preferable. However, in the course of sintering a silver ink, sintering proceeds through the approaching of silver particles to each other or the desorption of the protective agent. Therefore, it is far from preferable to simply select and apply a solvent with a high vapor pressure. Further, in the present invention, there also is the influence of the sintering promotion by moisture as described below. In the present invention, in consideration of these points, the vapor pressure at 70° C. has been specified to be 0.09 mmHg or more. This is because in the case of a silver ink containing a solvent of less than 0.09 mmHg as a dispersion medium, no matter how much the moisture content and the like are suited, sintering at a low temperature of 70° C. or less is unlikely to take place.

A specific example of the main solvent is an alcohol having the vapor pressure characteristics described above or a mixed solvent containing such an alcohol. As alcohols, monohydric alcohols having one OH group in a molecule and also polyhydric alcohols having two or more OH groups (diol, etc.) are applicable. A further specific configuration of the main solvent is normalized based on the relation with the silver particle content in the silver ink, the viscosity, the configuration of the protective agent, and the like. The detailed description of specific main solvents will be given in the description of the specific composition of the silver ink described below.

The dispersion medium of the present inventive silver ink contains the main solvent having the vapor pressure characteristics described above in an amount of 80% or more on a mass basis relative to the total dispersion medium. When the content of the main solvent is less than 80%, such a dispersion medium is unlikely to contribute to low-temperature calcination. The content of the main solvent may also be 100% relative to the total dispersion medium. In addition, when the content of the main solvent is 80% or more, a solvent that does not have the vapor pressure characteristics described above can be contained. For example, even a solvent having a vapor pressure at 20° C. of more than 40 mmHg may also be contained in the dispersion medium as long as its content is less than 20% relative to the total dispersion medium. The specific configuration of the dispersion medium in the present invention will be given in the description of the specific composition of the silver ink described below.

Incidentally, the method for measuring the vapor pressures of the dispersion medium is not particularly limited, and a known measurement method can be employed as long as vapor pressures at 20° C. and 70° C. can be measured. For example, a static method, a boiling point method, an isoteniscope method, a gas flow method, a differential calorimetry (DSC) method, an absolute method, and the like are applicable. In addition, depending on the kind of the dispersion medium, the vapor pressure at each temperature may be reported on various property databases and can also be referred to.

(III) Protective Agent

In the present invention, for the achievement of the low-temperature calcination of a silver ink, the configuration of a protective agent is specified. The protective agent of the silver ink of the present invention indispensably contains an amine compound. Then, it is required that the amine compound contained in the protective agent contains has a mass average molecular weight of 115 or less. The reason why the mass average molecular weight of the amine compound is restricted is that when a silver ink contains an amine compound having a mass average molecular weight of more than 115 as a protective agent, although such an ink at least forms a metal film through calcination, it is difficult to achieve the intended low resistance value. That is, a high-molecular-weight amine compound poses an obstacle to low-temperature sinterability.

The amine compound in the protective agent of the present invention has been specified by the mass average molecular weight in consideration of the fact that use of multiple kinds of amine compounds as a protective agent in the silver ink is allowed. As a general tendency, a high-molecular-weight amine compound is useful in inhibiting the aggregation of silver particles and has the effect of enhancing the dispersion of a silver ink. Meanwhile, a low-molecular-weight amine compound quickly volatilizes/evaporates during calcination and hardly remains in a metal film, while moderately inhibiting the aggregation of silver particles. Therefore, in many cases, a plurality of amine compounds are applied according to the silver particle content in the silver ink and the required properties. In the present invention, in consideration of the application of such several kinds of amine compounds, the protective agent has been specified by the mass average molecular weight. Incidentally, the mass average molecular weight is calculated by proportionally dividing the molecular weight of one or more amine compounds contained as a protective agent in the silver ink by the mass fraction.

Here, amine compounds to serve as a protective agent will be described in detail. With respect to the number of amino groups in an amine compound, a (mono)amine having one amino group or a diamine having two amino groups is applicable. In addition, the number of hydrocarbon groups bonded to an amino group is preferably one or two, that is, a primary amine ($RNH_2$) or a secondary amine ($R_2NH$) is preferable. Then, when a diamine is applied as a protective agent, it is preferable that at least one amino group is a primary amine or a secondary amine. The hydrocarbon group bonded to an amino group may be a chain hydrocarbon having a linear structure or a branched structure, or may alternatively be a hydrocarbon group having a cyclic structure. In addition, oxygen may also be partially contained.

Then, in the present invention, under the condition that the mass average molecular weight is 115 or less, one of or a combination of two or more of the monoamines and diamines described above, which are amine compounds, is used. Specific examples of amine compounds favorable for the protective agent of the present invention are $C_{4-6}$ amine compounds. More specifically, $C_4$ butylamine (molecular weight: 73.14), 1,4-diaminobutane (molecular weight: 88.15), 3-methoxypropylamine (molecular weight: 89.14), $C_5$ pentylamine (molecular weight: 87.17), 2,2-dimethylpropylamine (molecular weight: 87.17), 3-ethoxypropylamine (molecular weight: 103.17), N,N-dimethyl-1,3-propanediamine (molecular weight: 102.18), $C_6$ hexylamine (molecular weight: 101.19), and the like can be mentioned. In the case of the present invention, based on these amine compounds, a protective agent having a mass average molecular weight of 115 or less is preferably applied.

In addition, in addition to the amine compounds having relatively low molecular weights described above, amine compounds having relatively high molecular weights can also be used. As such amine compounds, $C_7$ heptylamine, benzylamine, N,N-diethyl-1,3-diaminopropane, $C_8$ octylamine, 2-ethylhexylamine, $C_9$ nonylamine, $C_{10}$ decylamine, diaminodecane, $C_{11}$ undecylamine, $C_{12}$ dodecylamine, diaminododecane, and the like can be mentioned. Such an amine compound having a relatively high molecular weight can also be used alone as long as the molecular weight is 115 or less. In addition, under the condition that the mass average molecular weight is 115 or less, combined use of an amine compound having a low molecular weight (amine compound with a molecular weight of 115 or less) and an amine compound having a high molecular weight (amine compound with a molecular weight of 116 or more) is allowed.

Then, the silver ink of the present invention also requires that the total amount of the above amine compounds contained in the protective agent is 1 part by weight or more and 14 parts by weight or less per 100 parts by weight of the silver particles. This is because even in the case of using an amine compound with the restricted mass average molecular weight described above, when its amount per 100 parts by weight of the silver particles exceeds 14 parts by weight, desorption from the silver particle surface is unlikely to proceed, which hinders sintering, making low-temperature calcination impossible. In addition, an amine compound in an amount of less than 1 part by weight per 100 parts by weight of the silver particles is unlikely to function as a protective agent, and aggregation/precipitation of silver particles may occur in the silver ink.

As a method for measuring the amine compound content for the calculation of the mass average molecular weight and the number of parts by weight described above, gas chromatography (GC), GC-MS, TG-MS, and the like are applicable. Even when a plurality of kinds of amine compounds are used, the content can be measured by suitably combining these analysis means.

Incidentally, in the present invention, protective agents other than amine compounds are also usable. Specifically, $C_{4-26}$ fatty acids can be mentioned. Specifically, saturated fatty acids such as butanoic acid ($C_4$), pentanoic acid ($C_5$), hexanoic acid ($C_6$), heptanoic acid ($C_7$), octanoic acid ($C_8$), nonanoic acid ($C_9$), decanoic acid (also called: capric acid, $C_{10}$), undecanoic acid (also called: undecylic acid, $C_{11}$), dodecanoic acid (also called: lauric acid, $C_{12}$), tridecanoic acid (also called: tridecyl acid, $C_{13}$), tetradecanoic acid (also called: myristic acid, $C_{14}$), pentadecanoic acid (also called: pentadecylic acid, $C_{15}$), hexadecanoic acid (also called: palmitic acid, $C_{16}$), heptadecanoic acid (also called: margaric acid, $C_{17}$), octadecanoic acid (also called: stearic acid, $C_{18}$), nonadecanoic acid (also called: nonadecylic acid, $C_{19}$), eicosanoic acid (also called: arachidic acid, $C_{20}$), behenic acid (also called: docosanoic acid, $C_{22}$), tricosanoic acid ($C_{23}$), lignoceric acid (also called: tetracosanoic acid, $C_{24}$), pentacosanoic acid ($C_{25}$), and cerotic acid (also called: hexacosanoic acid, $C_{26}$). In addition, as unsaturated fatty acids, palmitoleic acid ($C_{16}$), oleic acid ($C_{18}$), linoleic acid ($C_{18}$), linolenic acid ($C_{18}$), arachidonic acid ($C_{20}$), erucic acid ($C_{22}$), nervonic acid (also called: cis-15-tetrachocenic acid, $C_{24}$), and the like can be mentioned.

More specific configurations with respect to the kind, content, and the like of the protective agent are normalized by the silver particle content and the configuration of the dispersion medium. This point will be described in the description of the specific composition of the silver ink described below.

(IV) Moisture Content

To specify the moisture content in the silver ink is one of the distinctive features of the present invention. That is to say, conventionally, in a metal ink, water (moisture) is a component that should be avoided. Generally, an organic solvent is often applied as a dispersion medium of a metal ink. Also in the present invention, organic solvents such as alcohols and alkanes are used. An organic solvent is used as a dispersion medium of a metal ink for the purpose of maintaining the dispersion state of metal particles in the ink. That is, when an amine compound (alkylamine) or the like is applied as a protective agent of a metal ink, the metal particle surface is covered with a hydrophobic side chain. In order for a metal ink to have an increased metal particle content together with an excellent dispersion state, it is necessary to use a dispersion medium corresponding to the polarity of the metal particle surface. For this reason, an organic solvent is often used as a dispersion medium of a metal ink. Then, it is believed that when a highly polar solvent, such as water, is used alone or in the form of a mixture as a dispersion medium, the dispersion of metal particles is inhibited. Therefore, usually, water is inevitable in a dispersion medium but has been avoided as an impurity.

With respect to the presence of moisture, which has been avoided as described above, the present inventors have found that the addition of a trace amount is effective in the low-temperature calcination of a silver ink. The reason why a slight amount of moisture makes low-temperature calcination possible is not clear. The present inventors consider that this is because water molecules induce the desorption of the amine compound serving as a protective agent and promote the progress of the sintering of silver particles. Then, they believe that this action of water molecules has become prominent because of the configurations of the dispersion medium and the protective agent described above. Further, it has also been confirmed that then the content of moisture is a trace amount, no problem is caused with the dispersion state of silver particles in the silver ink.

According to the study by the present inventors, the moisture content in the silver ink is 500 ppm or more and 50,000 ppm or less on a mass basis relative to the total silver ink. When the content is less than 500 ppm, the low-temperature calcination suppressing effect is low, and the resistance value of the metal film tends to be high. Meanwhile, a content of more than 50,000 ppm results in excess water adsorbed on the silver particle surface, and the aggregation of silver particles occurs from such adsorbed water as a starting point, making it impossible to maintain a uniform dispersion state. The moisture content is preferably 700 ppm or more and 50,000 ppm or less, and more preferably 1,000 ppm or more and 50,000 ppm or less. The specification of the moisture content is an indispensable requirement always required regardless of the physical properties of the silver particles, the configuration of the dispersion medium, and the kind/content of the protective agent.

Incidentally, moisture in the silver ink includes, in addition to the state of being dissolved or dispersed as water in the dispersion medium, water molecules adsorbed on solid constituents, such as silver particles, etc. As a method for measuring the moisture content in the silver ink, quantitative analysis by a Karl Fischer titration method or the like is preferable. In addition, such moisture in the silver ink originates in water intentionally added to the silver ink to make the above content, and also originates in water incorporated in the course of producing silver particles or in the washing step described below.

(V) Specific Configuration of Silver Ink

The present inventive silver ink is composed of the silver particles, dispersion medium, and protective agent described above. Here, the specific configuration of a favorable silver ink in the present invention will be described in further detail. The silver ink of the present invention can be categorized according to the configuration of the dispersion medium, which can be set in consideration of the intended use of the silver ink (viscosity) and the silver particle content.

As described above, with respect to the configuration of the dispersion medium, alcohols having the vapor pressure characteristics described above and alcohol-containing solvents can be mentioned. Here, the present inventive silver ink is available for the following two kinds of silver inks: (A) a silver ink having a relatively low silver particle content and containing an alcohol-containing solvent (mixed solvent of an alcohol and an alkane) as a main solvent (hereinafter this silver ink is sometimes referred to as "first silver ink"); and (B) a silver ink having a relatively high silver particle content and containing an alcohol (alcohol with a molecular weight of 150 or more and 250 or less) as a main solvent (hereinafter this silver ink is sometimes referred to as "second silver ink). Hereinafter, favorable configurations of these specific two kinds of silver inks will be described.

(A) First Silver Ink (A-1) Silver Particle Content of First Silver Ink

The silver particle content in the first silver ink is relatively low, and is preferably less than 60% on a mass basis relative to the total silver ink. The content is more preferably 55% or less. Because of this silver particle content and the properties of the dispersion medium described below, the first silver ink is a silver ink having a relatively low viscosity.

(A-2) Configuration of Dispersion Medium of First Silver Ink

As the main solvent that occupies 80% or more of the dispersion medium of the first silver ink, a mixed solvent of an alcohol and an alkane is preferably applied. This is because the vapor pressure characteristics described above can be exhibited, contributing to low-temperature calcination. Here, at least one alcohol and at least one alkane are mixed. As the alcohol, at least one of propanol, butanol, pentanol, hexanol, heptanol, octanol, nonanol, decanol, and the like is preferably mixed. More preferred examples are 1-hexanol, 2-hexanol, 3-hexanol, cyclohexanol, 2-methyl-1-pentanol, 2-methyl-2-pentanol, 3-methyl-1-pentanol, 3-methyl-2-pentanol, 3-methyl-3-pentanol, 4-methyl-1-pentanol, 4-methyl-2-pentanol, 3,3-dimethyl-1-butanol, 3,3-dimethyl 2-butanol, 2-ethyl-1-butanol, 1-pentanol, 2-pentanol, 3-pentanol, tert-amyl alcohol, 2,2-dimethyl-1-propanol, 2-methyl-1-butanol, 3-methyl-1-butanol, 3-methyl-2-butanol, 1-butanol, 2-butanol, tert-butyl alcohol, 2-methyl-1-propanol, 1-propanol, and the like. Of the alcohols described above, for example, the vapor pressure at 20° C. of 1-butanol is 4.5 mmHg, which is not more than 40 mmHg or less, the standard value. In addition, its vapor pressure at 70° C. sufficiently exceeds 0.9 mmHg.

Meanwhile, as the alkane, at least one of heptane, octane, nonane, decane, undecane, dodecane, tetradecane, and the like is preferably mixed. More preferred examples are heptane, octane, decane, and dodecane. Of the alkanes described above, for example, the vapor pressure at 20° C. of heptane is 34 mmHg, which is not more than 40 mmHg or less, the standard value. In addition, the vapor pressure at 70° C. of heptane sufficiently exceeds 0.9 mmHg.

The mixing ratio between an alcohol and an alkane is preferably alcohol:alkane=1:8 to 3:1 on a mass basis. When an amine compound is used as a protective agent, a solvent obtained by mixing an alcohol and an alkane in this ratio is suitable. When a mixed solvent outside of the above ratio range is applied, particle aggregation or precipitation may occur, making it difficult to uniformly disperse particles. The mixing ratio between an alcohol and an alkane is more preferably alcohol:alkane=1:7 to 3:2.

The dispersion medium of the present inventive silver ink contains the mixed solvent of an alcohol and an alkane described above in an amount of 80% or more on a mass basis relative to the total weight of the dispersion medium. As long as this condition is satisfied, the dispersion medium of the first silver ink can contain a solvent that does not satisfy the vapor pressure characteristics described above (a vapor pressure at 20° C. of 40 mmHg or less and a vapor pressure at 70° C. of 0.09 mmHg or more). As solvents allowed to be present in the dispersion medium of the first silver ink, for example, methanol (vapor pressure at 20° C.: 95 mmHg), ethanol (vapor pressure at 20° C.: 44 mmHg), isopropyl alcohol (vapor pressure at 20° C.: 45 mmHg), acetone (vapor pressure at 20° C.: 182 mmHg), ethyl acetate (vapor pressure at 20° C.: 94 mmHg), hexane (vapor pressure at 20° C.: 155 mmHg), and the like can be mentioned.

(A-3) Protective Agent of First Silver Ink (Amine Compound)

In the first silver ink, as the protective agent, basically, as long as the mass average molecular weight is 115 or less, at least one of the above amine compounds can be applied. However, more preferably, N,N-dimethyl-1,3-diaminopropane, n-pentylamine, 3-methylbutylamine, 2-methylbutylamine, n-hexylamine, 3-methoxypropylamine, 3-ethoxypropylamine, and the like are applied. In addition, as long as the above restrictions are satisfied, an amine compound having a relatively high molecular weight can also be used. For example, n-octylamine, 2-ethylhexylamine, n-decylamine, n-undecylamine, n-dodecylamine, n-tetradecylamine, stearylamine, oleylamine, and the like can be used.

The total amine compound content in the first silver ink is naturally 1 part by weight or more and 14 parts by weight or less per 100 parts by weight of the silver particles. However, in relation to the main solvent and other protective agent described below, the total amine compound content in the first silver ink is preferably 3 parts by weight or more and 14 parts by weight or less per 100 parts by weight of the silver particles.

(A-4) Protective Agent Other than Amine Compound in First Silver Ink

As described above, in the silver ink of the present invention, protective agents other than amine compounds are also usable. In particular, in the first silver ink, a fatty acid is preferably added as an auxiliary protective agent. A fatty acid contributes to the dispersion of silver particles together with amine compounds, and also has the effect of improving the workability at the time of silver ink application. As the fatty acid, various $C_{4-26}$ fatty acids described above are applicable. In particular, oleic acid, erucic acid, lignoceric acid, and nervonic acid are preferably applied.

The content of the fatty acid serving as an auxiliary protective agent is preferably 0.01 mmol/g or more and 0.06 mmol/g or less on a silver particle mass basis (the number of moles per g of silver particles). When the content is less than 0.01 mmol/g, there is no effect as a protective agent. When the content is more than 0.06 mmol/g, there is a risk that the electrical resistance of the formed metal film increases.

When both an amine compound and a fatty acid are contained as protective agents, the ratio between the total amine compound content in moles on a silver particle mass basis (the total number of moles of the amine compound per g of silver particles) and the content of the fatty acid described above (amine compound content (mmol/g)/fatty acid content (mmol/g)) is preferably 5.0 or more. When the ratio is less than 5.0, that is, the proportion of the fatty acid is high, a metal film with a high resistance value might be formed. The ratio is more preferably 10.0 or more. In addition, it is not necessary to particularly set the upper limit on this ratio. By making the protective agents moderately amine-rich, a favorable metal film can be formed. However, when the amine compound is in excess of the fatty acid, the effect of the fatty acid weakens, and thus the ratio is preferably 120.0 or less.

(B) Second Silver Ink (B-1) Silver Particle Content of Second Silver Ink

The silver particle content in the second silver ink is relatively high, and is preferably 60% or more on a mass basis relative to the total silver ink. Because of the silver particle content and the properties of the dispersion medium described below, the second silver ink is a silver ink having a relatively high viscosity. This silver ink has an increased silver particle content and an increased viscosity, and thus is favorable for application to the formation of a thick metal film.

(B-2) Configuration of Dispersion Medium of Second Silver Ink

As the main solvent that occupies 80% or more of the dispersion medium of the second silver ink, an alcohol solvent having a molecular weight of 150 or more and 250 or less is preferably applied. This is for the purpose of, in a second silver ink having a relatively high silver particle content, uniformly dispersing silver particles, and also, during application and sintering, forming a favorable metal film at a low temperature. The reason for selecting an alcohol having such a molecular weight range is that it is possible to simultaneously achieve the enhancement of the viscosity of the ink for forming a thick film and also the ensuring of low-temperature sinterability. An alcohol having a molecular weight within this range has a vapor pressure at 70° C. of 0.09 mmHg or more, and can exhibit sufficient volatility as a main solvent of a low-temperature sintering ink.

As specific examples of alcohols favorable as the main solvent of the second silver ink, terpineol (molecular weight: 216.32), dihydroterpineol (molecular weight: 156.27), 2,2,4-trimethyl-1,3-pentandiol monoisobutyrate (molecular weight: 216.32, product name: NKY NG-120), and the like can be mentioned. A preferred example is 2,2,4-trimethyl-1,3-pentandiol monoisobutyrate. For example, the vapor pressure at 20° C. of 2,2,4-trimethyl-1,3-pentandiol monoisobutyrate is 0.01 mmHg, which is significantly lower than the standard value of 40 mmHg. In addition, the vapor pressure at 70° C. of 2,2,4-trimethyl-1,3-pentandiol monoisobutyrate is a vapor pressure of 0.11 mmHg, which satisfies the standard value of 0.09 mmHg or more. The main solvent of the second silver ink is preferably composed of at least one of these alcohols.

The dispersion medium of the second silver ink contains the above alcohol as a main solvent in an amount of 80% or more on the basis of the total mass of the silver ink. As long as this condition is satisfied, the dispersion medium of the second silver ink can contain an alcohol outside the molecular weight range described above. In addition, a solvent that does not satisfy the vapor pressure characteristics described above (a vapor pressure at 20° C. of 40 mmHg or less and a vapor pressure at 70° C. of 0.09 mmHg or more) can also be contained. For example, as alcohols of lower molecular weights than the above alcohols, methanol, ethanol, propanol, butanol, pentanol, hexanol, heptanol, octanol, and the like can be contained. Further, an alkane used as a main solvent of the first silver ink can also be contained. For example, as alkanes, hexane, heptane, octane, nonane, and decane can be contained. As solvents forming the dispersion medium in addition to an alcohol having a molecular weight of 150 or more and 250 or less, methanol, ethanol, propanol, butanol, hexanol, octane, and decane are preferable. Incidentally, in the second silver ink, the content of the main solvent composed of an alcohol having a molecular weight of 150 or more and 250 or less is more preferably 90% or more and 100% or less on the basis of the silver ink mass.

(B-3) Protective Agent of Second Silver Ink (Amine Compound)

In the second silver ink, as the protective agent, basically, as long as the mass average molecular weight is 115 or less, at least one of the above amine compounds can be applied. More preferably, low-molecular-weight amine compounds such as 3-methoxypropylamine (molecular weight: 89.14), 3-ethoxypropylamine (molecular weight: 103.17), n-hexylamine (molecular weight: 101.19), and 2,2-dimethylpropylamine (molecular weight: 87.17) are applied. In addition, as long as the restrictions on the mass average molecular weight described above (115 or less) are satisfied, an amine compound having a relatively high molecular weight with a molecular weight of 116 or more can also be used. For example, n-Octylamine, 2-ethylhexylamine, n-decylamine, n-dodecylamine, stearylamine, oleylamine, and the like can be used.

Also here, the total amine compound content in the first silver ink is naturally 1 part by weight or more and 14 parts by weight or less per 100 parts by weight of the silver particles. However, in consideration of the configuration of the main solvent and the configuration of favorable amine compounds, the total amine compound content in the second silver ink is more preferably 1 part by weight or more and 10 parts by weight or less.

(B-3) Additive of Second Silver Ink

Additives other than the silver particles, protective agent, and dispersion medium may be added to the second silver ink. Specifically, such additives serve to adjust the viscosity of the high-viscosity metal ink using a main solvent and a protective agent described above and also improve its application properties (printability). Specifically, celluloses such as methyl cellulose, ethyl cellulose, carboxymethyl cellulose, oxyethyl cellulose, benzyl cellulose, and propyl cellulose are added.

In particular, high-molecular-weight ethyl celluloses having number average molecular weights of 40,000 to 90,000 are preferable. In addition, it is also possible to add a high-molecular-weight ethyl cellulose and a low-molecular-weight ethyl cellulose having a number average molecular weight of 5,000 to 30,000. The amount of such celluloses added is preferably 1.0% or more and 5.0% or less on a mass basis relative to the total silver ink.

(VI) Electrical Characteristics of Metal Film Formed from Present Inventive Silver Ink The present inventive silver ink described above is a silver ink that can be calcined at a low temperature of 70° C. or less. Here, "capable of low-temperature calcination" does not employ a simple definition that all needed is to form a metal film by heating at 70° C. When an ink is capable of low-temperature calcination, this means that a metal film can be formed by heating at a temperature of 70° C. or less within 3 hours, and the volume resistance of the metal film can be 20 μΩcm or less. Incidentally, it is not necessary to particularly set the lower limit on the calcination temperature. However, when the dispersion medium and the protective agent are suitable, the present inventive silver ink can be sintered also at ambient temperature.

As a more specific index, the silver ink of the present invention is preferably such that when an ink applied film formed on a PET substrate by bar coating or screen printing is calcined at 70° C. for 30 minutes or more and 180 minutes or less, the resulting electrical conductor has a volume resistance of 5 μΩcm or more and 20 μΩcm or less.

(VII) Method for Producing of Present Inventive Silver Ink

Next, a method for producing the present inventive silver ink will be described. The present inventive silver ink can be produced by dispersing silver particles to which a protective agent is bonded in the dispersion medium described above. Here, as a method for producing silver particles, it is preferable to employ a silver-amine complex method, in which a silver-amine complex is used as a precursor. In this silver particle production method, a thermally decomposable silver compound, such as silver oxalate, is used as a starting material, and an amine compound serving as a protective agent is allowed to react therewith to form a silver-amine complex. Then, the silver-amine complex is heated as a precursor to give silver particles. Such a silver-amine complex method makes it possible to produce silver particles that are fine and have a uniform particle size.

The method for producing silver particles will be described in detail. First, as the silver compound serving as a starting material, silver oxalate, silver nitrate, silver acetate, silver carbonate, silver oxide, silver nitrite, silver benzoate, silver cyanate, silver citrate, silver lactate, and the like are preferable. Among these silver compounds, silver oxalate ($Ag_2C_2O_4$) or silver carbonate ($Ag_2CO_3$) is particularly preferable. Silver oxalate and silver carbonate can be decomposed at a relatively low temperature to form silver particles even without a reducing agent.

Incidentally, silver oxalate is explosive in a dry state. Accordingly, silver oxalate is preferably mixed with water or an organic solvent (alcohol, alkane, alkene, alkyne, ketone, ether, ester, carboxylic acid, fatty acid, aromatic, amine, amide, nitrile, etc.) and thus wetted to ensure handleability, and then utilized. In addition, silver carbonate has low possibility of explosion unlike silver oxalate. However, when previously wetted, silver carbonate can be more easily mixed with an amine compound and a fatty acid serving as protective agents. Therefore, water or an organic solvent is preferably mixed. When silver oxalate or silver carbonate is wetted, it is preferable that 5 to 200 parts by weight of water or an organic solvent is mixed per 100 parts by weight of the silver compound.

A silver-amine complex serving as a precursor of silver particles is formed by mixing/reacting the above silver compound with an amine compound. This amine compound acts also as a protective agent in the silver ink. Therefore, as the amine compound used herein, an amine compound adjusted to have a mass average molecular weight of 115 or less as described above is applied.

Incidentally, in the case of a silver ink containing a fatty acid as a protective agent together with the amine compound, it is preferable that an amine compound is added, and then a fatty acid is added, or an amine compound and a fatty acid are simultaneously added.

A reaction between the silver compound and the amine compound forms a silver-amine complex, and a reaction system for silver particle production is formed. Subsequently, the reaction system is heated, whereby silver particles are formed. The heating temperature at this time is preferably equal to or higher than the decomposition temperature of the formed silver-amine complex. The decomposition temperature of a silver-amine complex differs depending on the kind of amine coordinated to the silver compound. However, in the case of a silver complex of the amine compound applied in the present invention, the specific decomposition temperature is 90 to 130° C.

Through this heating step, silver particles to which a protective agent is bonded are precipitated. The silver particles can be recovered by the solid-liquid separation of the reaction mixture. The recovered silver particles are washed, thereby giving silver particles to serve as a raw material of the silver ink. This washing step also acts to adjust the amount of protective agent adsorbed on the silver particles.

In the silver ink of the present invention having a controlled moisture content, the contents of the washing step are relatively important. In the course of producing silver particles described above, depending on the solvent used as a washing liquid, the reaction atmosphere, and the like, moisture may be adsorbed on silver particles. In conventional silver inks, moisture is avoided. Therefore, the washing step has also been an opportunity to remove water from silver particles.

As the solvent used in the silver particle washing step, an alcohol, such as methanol, ethanol, propanol, or butanol, or octane is used. For the washing of conventional silver inks, these solvents having low moisture contents have also been believed to be preferable. This is because such a solvent is used for the purpose of absorbing moisture from silver particles.

Meanwhile, in the case of the silver ink of the present invention, contrary to conventional, only a slight amount of moisture is added. Accordingly, within this restricted moisture content range, moisture does not have to be removed from silver particles in the washing step, and may rather be added.

For example, in the washing step in the production of the silver ink of the present invention, when washing is performed with a solvent containing a trace amount of moisture open to the atmosphere, a certain amount of moisture can be added to the silver ink. Due to the moisture in the solvent, the moisture content specified in the present invention may be reached.

However, the intentional addition of water in the washing step is not indispensable. This is because there is an opportunity to add and adjust moisture also in subsequent steps. Therefore, the washing step may be performed by use of a managed/stored solvent having a low moisture content, or washing with a dewatered solvent is also possible.

In addition, the conditions for the washing step are the same as for the conventional silver particle washing step. Specifically, the amount of solvent is preferably 1 to 10 times the silver weight. Then, the number of times of washing is preferably 1 to 5. Incidentally, the washing operations are preferably such that silver particles and the solvent are mixed and stirred, followed by solid-liquid separation by filtration, centrifugation, or the like. These operations are defined as one time of washing and preferably performed a plurality of times.

Then, the silver particles washed as described above are dispersed in a dispersion medium, whereby the present inventive silver ink can be produced. Moisture can be suitably added in this stage to adjust the moisture content.

Advantageous Effects of the Invention

The present inventive silver ink enables a practical metal film with a low resistance value to be formed even through calcination at a low temperature of 70° C. or less.

BRIEF DESCRIPTION OF DRAWINGS

The Figure is a diagram showing the volume resistance of the silver ink produced in the first embodiment after calcination.

DESCRIPTION OF EMBODIMENTS

First Embodiment: Hereinafter, favorable embodiments of the present invention will be described. In this embodiment, a silver ink (corresponding to a first silver ink), in which silver particles based on hexylamine (molecular weight: 101.2) as an amine compound serving as a protective agent were dispersed in a mixed solvent (main solvent) of an alcohol (hexanol) and an alkane (decane), was produced. At this time, the moisture content in the silver ink was adjusted to produce several kinds of silver inks, and the low-temperature sinterability was evaluated.

[Production of Silver Ink]

In this embodiment, silver particles were produced by a thermal decomposition method, and they were dispersed in a solvent to produce a metal ink. In the production of silver particles, first, 10 g of methanol was added to 25 g of silver oxalate (silver: 17.75 g), which is a starting material, to cause wetting. Then, amine compounds serving as a protective agent were added to the silver oxalate. Specifically, first, N,N-dimethyl-1,3-diaminopropane (16.82 g (164.61 mmol)) was added to the silver oxalate and kneaded for a while, then hexylamine (19.02 g (187.86 mmol)) and dodecylamine (2.90 g (15.63 mmol)) serving as a main protective agent were added, and further erucic acid (0.70 g (2.08 mmol)) was added as a fatty acid, which is an auxiliary protective agent, and kneaded. The mixture was heated and stirred at 110° C. During this heating and stirring, the cream-colored silver complex gradually became brown and further changed to black. This heating/stirring operation was performed until the generation of bubbles from the reaction system stopped.

After the completion of the reaction, the reaction system was allowed to cool to room temperature, and then methanol (40 ml) was added as a solvent (washing liquid) and thoroughly stirred, followed by centrifugation (2,000 rpm, 60 sec). The supernatant was removed, solid-liquid separation was performed, methanol (40 ml) was added again and stirred, centrifugation was performed, and the supernatant was removed. Finally, methanol was added once again, and the same washing operation was performed. Thus, the washing operation with a solvent was repeated three times, whereby excess protective agents were removed, and the silver particles were purified.

Then, to the produced silver fine particles, a mixed solvent of decane and hexanol (decane:hexanol=4:3 (mass ratio), vapor pressure by a static method: 15.0 mmHg (at 20° C.), 25.0 mmHg (at 70° C.)) was added as a dispersion medium (main solvent) to form a silver ink. The metal ink produced through the above steps has a silver concentration of 50 mass %

The silver ink produced through the above steps was subjected to composition analysis to measure the contents of the amine compounds, which are a protective agent. The composition analysis was performed by GC-MS. As the GC-MS analyzer, 7890B manufactured by Agilent Technologies, Inc., was used for the GC part, and JMS-Q1500GC manufactured by JEOL Ltd., which is a quadrupole mass spectrometer, was used for the MS part. As the ionizing method, photoionization was used. In addition, for the GC sample introduction part, a Pyrolyzer manufactured by Frontier Laboratories Ltd., was installed and used. At the time of analysis, the metal ink was diluted 12.5-fold by volume, and then 5 μL was subjected to the analysis. Other measurement conditions were as follows.

<GC Conditions>
Column: UA-530M-0.25F (manufactured by Frontier Laboratories Ltd.)
Column flow rate: 1.0 ml/min. He
Split ratio: 30
Oven temperature setting: 40° C., 6 min.→heating (10° C./min.)→360° C., 2 min.
Inlet temperature: 250° C.
<MS Conditions>
Q-pole temperature: 70° C.
Ion source temperature: 200° C.
Mode: Scan (m/z=10 to 350)
Photoionization energy: 10.18 eV or higher Further, the moisture content in the silver ink was measured by a Karl Fischer titration method. The silver ink was calcined at 150° C. to dry/vaporize moisture, and quantified by a Karl Fischer aquameter (MKC-610 manufactured by Kyoto Electronics Manufacturing Co., Ltd.). As a result of these analyses, the composition of the silver ink was as shown in the following Table 1.

TABLE 1

| Category | | Component | Content (mass %) |
|---|---|---|---|
| Silver particles | | Ag | 50.0 |
| Dispersion medium | Main solvent | Hexanol | 19.34 |
| | | Decanol | 25.78 |
| | Others | Methanol | 2.00 |

TABLE 1-continued

| Category | | Component | Content (mass %) |
|---|---|---|---|
| Protective agent | Amine compound | Hexylamine | 2.00 |
| | | N,N-Dimethyl-1,3-diaminopropane | 0.28 |
| | | Dodecylamine | 0.14 |
| | Fatty acid | Erucic acid | 0.44 |
| Moisture | | Water | 0.02 |

As described above, the silver ink contains amine compounds (hexylamine, N,N-dimethyl-1,3-diaminopropane, dodecylamine) and a fatty acid (erucic acid) as protective agents. The total mass average molecular weight of the amine compounds was calculated to be 110.98. In addition, the amine compound content per 100 parts by weight of the silver particles is 4.84 parts by weight. Then, the moisture content relative to the total silver ink was 200 ppm on a mass basis. In the following evaluation tests, the silver ink serving as a base is referred to as No. B1.

In this embodiment, moisture was added to the silver ink produced above, thereby producing silver inks in which the moisture contents on a mass basis relative to the total silver ink were 500 ppm, 1,000 ppm, 5,000 ppm, 10,000 ppm, and 50,000 ppm, respectively. The moisture content was adjusted as follows. A small amount of silver ink was collected and weighed, and, from the measured mass of the ink, water to make up for the desired value was added and stirred.

With respect to the silver inks produced through the above steps (moisture content: 500 ppm (No. A1), 1,000 ppm (No. A2), 5,000 ppm (No. A3), 10,000 ppm (No. A4), 50,000 ppm (No. A5)), the possibility of low-temperature sintering was examined. In the low-temperature sinterability evaluation test, each ink was applied to a PET substrate by use of a fully automatic film applicator (manufactured by TQC). 75 μL of an ink was dropped on a film and swept/printed at a speed of 10 mm/sec with an applicator having a set gap of 50 μm, thereby preparing a silver ink film with a dimension: 100× 150 mm, followed by calcination at 70° C. in air to form a metal film. Under such silver ink application/calcination conditions, calcination was performed for 5 minutes, 10 minutes, 30 minutes, 60 minutes, 120 minutes, and 180 minutes, and the electrical resistance values of the resulting metal films were measured. The volume resistance (μΩcm) was measured by use of a resistivity meter (Loresta-GP MCP-T610 manufactured by Mitsubishi Chemical Analytech Co., Ltd.). In addition, a cross-section of each obtained film was subjected to SEM observation to measure the film thickness. From the obtained electrical resistance value and film thickness, the volume resistance value was calculated.

The results of the evaluation test are shown in the Figure. In all the silver inks, the volume resistance value tends to decrease with an increase in the calcination time. This is because the sintering of silver particles proceeds with the lapse of the calcination time, resulting in densification and electrical conductivity improvement in a metal film. However, it was confirmed that when the condition "a volume resistance value of 20 μΩcm or less" is considered as an index of low-temperature sintering, it was not possible for a silver ink having a low moisture content (200 ppm, no moisture added) (No. B1) to meet the standard. Then, the volume resistance value of a metal film formed from a silver ink having a moisture content adjusted to 500 ppm or more (No. A1 to No. A5) was 20 μΩcm or less. That is, it was confirmed that these silver inks having adjusted moisture contents are excellent in low-temperature sinterability.

Second Embodiment: In this embodiment, several kinds of silver inks were produced with the configuration of the dispersion medium, the kind of protective agent (amine compounds), the silver particle content, and the like being changed.

Specifically, 2,2,4-trimethyl-1,3-pentandiol monoisobutyrate (NKY NG-120, vapor pressure by a static method: 0.01 mmHg (at 20° C.), 0.18 mmHg (at 70° C.)) was applied as a main solvent, and a silver ink having a silver content of 70 mass % (No. A6), which corresponds the second silver ink of the invention of the present application, was produced. In this silver ink, silver particles produced by use of methoxypropylamine as a protective agent were applied. The method for producing the silver particles is basically the same as the method in the first embodiment. The results of the composition analysis of this silver ink (GC-MS, Karl Fischer titration method) are shown in Table 2.

TABLE 2

| Category | | Component | Content (mass %) |
|---|---|---|---|
| Silver particles | | Ag | 70.0 |
| Dispersion medium | Main solvent | 2,2,4-Trimethyl-1,3-pentandiol monoisobutyrate (NKY NG120) | 25.0 |
| | Others | Methanol | 2.00 |
| Protective agent | Amine compound | Methoxypropylamine | 1.00 |
| Additive | Cellulose | Ethyl cellulose | 1.96 |
| Moisture | | Water | 0.04 |

This silver ink contains only methoxypropylamine, which is an amine compound, as a protective agent, and the total average molecular weight of the amine compound is 89.14. In addition, the amine compound content per 100 parts by weight of the silver particles is 1.43 parts by weight.

Incidentally, the moisture content of this silver ink after production was also 400 ppm on a mass basis, that is, less than the lower limit (500 ppm). Thus, moisture was added before the evaluation test to adjust the content to 700 ppm.

In addition to the above silver ink, a silver ink in which the amine compound serving as a protective agent was hexylamine as in the first embodiment, and the main solvent was a mixed solvent of butanol and octane (butanol:octane=3:7 (weight ratio), vapor pressure by a static method: 8.0 mmHg (at 20° C.), 121.0 mmHg (at 70° C.)), was produced (No. A7). Further, as comparative examples, a plurality of inks, that is, a silver ink in which octylamine (molecular weight: 129.24) was used, and amine compounds having a mass average molecular weight of more than 115 were applied (No. B4), and a silver ink outside the set ranges of the present invention in terms of the moisture content and other configurations (No. B5) were produced.

Then, the silver inks were each subjected to the low-temperature sinterability evaluation test. In this embodiment, with respect to the silver inks other than No. A6, metal films were each produced with the same application method and calcination conditions as in the first embodiment, and the lowest value in the measured volume resistance values was recorded.

In addition, the silver ink No. A6 had high viscosity (100,000 mPa-S) and was difficult to uniformly apply with an applicator. Thus, its application was performed with a screen printer (LS-150 manufactured by Newlong Seimitsu Kogyo Co., Ltd.). Application was performed under conditions of a clearance of 1.5 mm and a printing speed of 100 mm/sec, and a 40×40 mm silver ink film was prepared. This film was calcined in air at 70° C. in the same manner, thereby forming a metal film. The volume resistance measurement method was performed by the same method as in the first embodiment.

The examination results in this embodiment are shown in Table 3. Incidentally, Table 3 also shows the results of the silver inks of the first embodiment (No. A1 to No. A5, No. B1).

TABLE 3

| | Silver ink configuration | | | | | | | | |
|---|---|---|---|---|---|---|---|---|---|
| | | | Amine compound | | | | | | |
| No. | Ag content (mass %) | Main solvent | Main amine compound | Average molecular weight | Amine density (wt %) | Amine content per 100 parts by weight of silver (part by mass) | Moisture content (ppm) | Volume resistance value (μΩ · cm) | Group |
| A1 | 50.0 | Decane/hexanol 4:3 | Hexylamine | 110.98 | 2.42 | 4.84 | 500 | 16 | Examples |
| A2 | 50.0 | Decane/hexanol 4:3 | Hexylamine | 110.98 | 2.42 | 4.84 | 1000 | 14.3 | |
| A3 | 49.8 | Decane/hexanol 4:3 | Hexylamine | 110.98 | 2.41 | 4.84 | 5000 | 18.1 | |
| A4 | 49.5 | Decane/hexanol 4:3 | Hexylamine | 110.98 | 2.40 | 4.84 | 10000 | 13.9 | |
| A5 | 47.6 | Decane/hexanol 4:3 | Hexylamine | 110.98 | 2.30 | 4.84 | 50000 | 9.7 | |
| A6 | 70.0 | 2,2,4-Trimethyl-1,3-pentandiol monoisobutyrate | Methoxypropylamine | 89.14 | 1.00 | 1.43 | 700 | 14.82 | |
| A7 | 50.0 | Butanol/octane 3:7 | Hexylamine | 111.41 | 2.32 | 4.64 | 1000 | 16.8 | |
| A8 | 50.0 | Decane/hexanol 4:3 | Hexylamine | 106.55 | 4.42 | 8.84 | 1000 | 19.6 | |
| B1 | 50.0 | Decane/hexanol 4:3 | Hexylamine | 110.65 | 2.42 | 4.84 | 200 | 27.1 | Comparative Examples |
| B2 | 50.0 | Decane/hexanol 4:3 | Hexylamine | 104.38 | 7.41 | 14.84 | 1000 | 29.9 | |
| B3 | 50.0 | Decane/hexanol 4:3 | Hexylamine | 103.10 | 10.41 | 20.84 | 1000 | 35.3 | |
| B4 | 50.0 | Decane/hexanol 4:3 | Octylamine | 133.79 | 2.62 | 5.24 | 1000 | 22.3 | |
| B5 | 45.5 | Decane/hexanol 4:3 | Hexylamine | 110.65 | 2.20 | 4.84 | 100000 | —*1 | |
| B6 | 50.0 | Decane/hexanol 4:3 | Hexylamine | 110.65 | 0.50 | 1.00 | 1000 | —*1 | |

*1Precipitation occurred, thus evaluation as a silver ink was not possible.

From the examination results in this embodiment, the necessity for specifying both the content and mass average molecular weight of amine compounds serving as a protective agent can be confirmed. That is, with respect to the amine compound content, in a silver ink having an amine content per 100 parts by weight of the silver particles of more than 14 (No. B2 or B3), the volume resistance value of the metal film after calcination is more than 20 μΩcm. Thus such an ink cannot be said to have low-temperature sinterability. In addition, when the mass average molecular weight of the amine compound as a protective agent is more than 115 (No. B4), the volume resistance value is more than 20 μΩcm, indicating that such an ink is not a suitable silver ink either.

With respect to the moisture content, in a silver ink to which excess moisture is added, precipitation occurred after the addition of moisture, and evaluation as a silver ink was not possible (No. B5). In addition, precipitation occurred also when the amount of amine compound serving as a protective agent was too small (No. B6). A protective agent is an additive for suppressing the aggregation of silver particles and ensuring dispersion. When its amount is too small, such an ink does not function as a silver ink.

In contrast to the above comparative examples, it was confirmed that the silver inks of Nos. A6 to A8 additionally examined in this embodiment exhibited excellent low-temperature sinterability. It can be said that in these silver inks, the amine compound and moisture contents are set with appropriate ranges.

INDUSTRIAL APPLICABILITY

As described above, in the present inventive silver ink, the configuration about the amine compound(s) serving as a protective agent is optimized, and also moisture, which has conventionally been believed to be an element that should not be contained, is slightly contained. As a result, the present inventive silver ink has low-temperature sinterability, and can form a favorable electrically-conductive film with a low resistance value even at a calcination temperature of 70° C. or less. The present invention is useful for the formation of electrodes, lines, or metal films on circuit boards of various electronic devices or on transparent substrates of touch panels and the like, for example.

The invention claimed is:

1. A silver ink comprising silver particles and a protective agent containing at least one amine compound dispersed in a dispersion medium, wherein
   wherein the silver particles do not comprise a reducing agent;
   the dispersion medium contains a main solvent having a vapor pressure at 20° C. of 40 mmHg or less and a vapor pressure at 70° C. of 0.09 mmHg or more in an amount of 80% or more on a mass basis relative to the total dispersion medium,
   the amine compound contained in the protective agent has a mass average molecular weight of 115 or less,
   a total amount of the amine compound contained in the protective agent is 1 part by weight or more and 1.43 parts by weight or less per 100 parts by weight of the silver particles, and
   the silver ink has a moisture content that is 500 ppm or more and 50,000 ppm or less on a mass basis relative to the total silver ink.

2. The silver ink according to claim 1, wherein the main solvent is a mixed solvent including at least one alcohol and at least one alkane mixed in an alcohol:alkane ratio of 1:8 to 3:1 on a mass basis.

3. The silver ink according to claim 2, wherein the total amount of the amine compound contained in the protective agent is 3 parts by weight or more and 14 parts by weight or less per 100 parts by weight of the silver particles.

4. The silver ink according to claim 2, wherein the protective agent further comprises a $C_4$-26 fatty acid, and wherein the content of the fatty acid is 0.01 mmol/g or more and 0.06 mmol/g or less on a silver particle mass basis.

5. The silver ink according to claim 4, wherein a ratio between a total amine compound content and a fatty acid content (amine compound content (mmol/g)/fatty acid content (mmol/g)) in moles on a silver particle mass basis is 5.0 or more and 120.0 or less.

6. The silver ink according to claim 1, wherein the main solvent is a solvent including at least one alcohol having a molecular weight of 150 or more and 250 or less.

7. The silver ink according to claim 6, wherein the total amount of the amine compound contained in the protective agent is 1 part by weight or more and 10 parts by weight or less per 100 parts by weight of the silver particles.

8. The silver ink according to claim 6, comprising, as an additive, a cellulose in an amount of 1.0% or more and 5.0% or less on a mass basis relative to the total silver ink.

9. The silver ink according to claim 1, wherein the silver particles have an average particle size of 10 nm or more and 300 nm or less.

10. The silver ink according to claim 1, having a silver particle content of 20 mass % or more and 85 mass % or less relative to the total mass of the silver ink.

11. The silver ink according to claim 1, wherein
    when the silver ink is applied by bar coat printing or screen printing and calcined at 70° C. for 30 minutes or more and 180 minutes or less, the resulting electrical conductor has a volume resistance of 5μΩcm or more and 20μΩcm or less.

12. The silver ink according to claim 3, wherein the protective agent further comprises a C4-26 fatty acid, and wherein the content of the fatty acid is 0.01 mmol/g or more and 0.06 mmol/g or less on a silver particle mass basis.

13. The silver ink according to claim 7, comprising, as an additive, a cellulose in an amount of 1.0% or more and 5.0% or less on a mass basis relative to the total silver ink.

14. The silver ink according to claim 2, wherein the silver particles have an average particle size of 10 nm or more and 300 nm or less.

15. The silver ink according to claim 3, wherein the silver particles have an average particle size of 10 nm or more and 300 nm or less.

16. The silver ink according to claim 4, wherein the silver particles have an average particle size of 10 nm or more and 300 nm or less.

17. The silver ink according to claim 5, wherein the silver particles have an average particle size of 10 nm or more and 300 nm or less.

18. The silver ink according to claim 6, wherein the silver particles have an average particle size of 10 nm or more and 300 nm or less.

19. The silver ink according to claim 7, wherein the silver particles have an average particle size of 10 nm or more and 300 nm or less.

20. The silver ink according to claim 8, wherein the silver particles have an average particle size of 10 nm or more and 300 nm or less.

\* \* \* \* \*